(12) United States Patent
Brathwaite et al.

(10) Patent No.: US 9,518,612 B2
(45) Date of Patent: Dec. 13, 2016

(54) METHOD AND TOOL FOR PRODUCING A COUPLING WITH A FLAT BOTTOM AND CENTRAL PROTRUSION

(71) Applicant: Siemens Aktiengesellschaft, Munich (DE)

(72) Inventors: Adrian Brathwaite, South Hykeham (GB); Shane Butler, Lincolnshire (GB)

(73) Assignee: Siemens Aktiengesellschaft, Munich (DE)

( * ) Notice: Subject to any disclaimer, the term of this patent is extended or adjusted under 35 U.S.C. 154(b) by 59 days.

(21) Appl. No.: 14/390,416

(22) PCT Filed: Jan. 30, 2013

(86) PCT No.: PCT/EP2013/051780
§ 371 (c)(1),
(2) Date: Oct. 3, 2014

(87) PCT Pub. No.: WO2013/152876
PCT Pub. Date: Oct. 17, 2013

(65) Prior Publication Data
US 2015/0053526 A1    Feb. 26, 2015

(30) Foreign Application Priority Data

Apr. 11, 2012  (EP) .................... 12163735

(51) Int. Cl.
*F16D 11/14* (2006.01)
*B23F 21/02* (2006.01)
(Continued)

(52) U.S. Cl.
CPC ............... *F16D 11/14* (2013.01); *B23F 15/06* (2013.01); *B23F 21/023* (2013.01); *F16D 2011/008* (2013.01); *F16D 2250/00* (2013.01)

(58) Field of Classification Search
CPC .............................. B23F 21/023; B23F 15/06
See application file for complete search history.

(56) References Cited

U.S. PATENT DOCUMENTS 2,308,891 A    1/1943   Miller
2,334,366 A   11/1943   Wildhaber
(Continued)

FOREIGN PATENT DOCUMENTS

CA         2070819 A1   10/1991
CN       101733485 A    6/2010
(Continued)

*Primary Examiner* — Mark Manley
(74) *Attorney, Agent, or Firm* — Beusse Wolter Sanks & Maire (57) ABSTRACT

A curvic coupling for rotational coupling is provided herein. The curvic coupling includes: plural teeth arranged in a circle and protruding from a circle plane extending in a radial direction and a circumferential direction, wherein a side surface of a tooth of the plural teeth is opposite to a side surface of another tooth of the plural teeth, and wherein the tooth is adjacent to the other tooth and is separated from the other tooth by a separating surface. The separating surface includes a flat surface lying in the circle plane, wherein the separating surface includes a central protrusion between the side surface of the tooth and the side surface of the other tooth, and wherein the protrusion protrudes from the circle plane.

22 Claims, 4 Drawing Sheets (51) Int. Cl.
*B23F 15/06* (2006.01)
*F16D 11/00* (2006.01)

(56) References Cited

U.S. PATENT DOCUMENTS

| | | | |
|---|---|---|---|
| 2,384,582 A | 9/1945 | Wildhaber | |
| 2,558,203 A | 6/1951 | Wildhaber | |
| 2,654,456 A | 10/1953 | Wildhaber | |
| 2,750,850 A | 6/1956 | Wildhaber | |
| 4,257,147 A | 3/1981 | Moss | |
| 6,672,966 B2* | 1/2004 | Muju | F16D 1/112 415/124.2 |
| 6,893,305 B2* | 5/2005 | Natsume | B63H 20/14 440/75 |
| 7,445,575 B2* | 11/2008 | Capito | F16D 11/04 475/204 |
| 2009/0053977 A1 | 2/2009 | Faulstich | |
| 2010/0283342 A1* | 11/2010 | Grosskopf | F16D 11/14 310/78 |

FOREIGN PATENT DOCUMENTS

| | | |
|---|---|---|
| EP | 1184122 A1 | 3/2002 |
| GB | 495944 A | 11/1938 |
| GB | 514572 A | 11/1939 |
| GB | 551975 A | 3/1943 |
| GB | 572612 A | 10/1945 |
| GB | 592648 A | 9/1947 |
| GB | 594492 A | 11/1947 |
| GB | 659446 A | 10/1951 |
| GB | 734127 A | 7/1955 |
| GB | 1439707 A | 6/1976 |
| GB | 2436461 B | 8/2008 |
| JP | 3002950 U | 10/1994 |
| SU | 1057210 A1 | 11/1983 |
| SU | 1368521 A1 | 1/1988 |
| WO | 1184122 A1 | 3/2002 |
| WO | 03024652 A2 | 3/2003 |

* cited by examiner

METHOD AND TOOL FOR PRODUCING A COUPLING WITH A FLAT BOTTOM AND CENTRAL PROTRUSION

CROSS REFERENCE TO RELATED APPLICATIONS

This application is the US National Stage of International Application No. PCT/EP2013/051780 filed Jan. 30, 2013, and claims the benefit thereof. The International Application claims the benefit of European Application No. EP12163735 filed Apr. 11, 2012. All of the applications are incorporated by reference herein in their entirety.

FIELD OF INVENTION

The present invention relates to a method of producing two coupling elements with a flat bottom and central protrusion. Moreover, the invention relates to the shape of the grinding tool to produce the flat bottom and central protrusion.

ART BACKGROUND

Two engaging curvic couplings may be used to rotationally couple two elements, such as rotation shafts, connected to the respective curvic couplings. The curvic coupling may also be referred to as a clutch member or clutch wheel. In particular, the curvic coupling may be referred to as a toothed face clutch.

GB 592,648 discloses a toothed face clutch and a method for producing the same, wherein the clutch member comprises teeth, which have longitudinally craft helical side surfaces.

GB 572,612 discloses a face clutch and a method for producing the same, wherein two surfaces are longitudinally convex or longitudinally concave.

GB 1,439,707 discloses a coupling device having means for relieving circumferential stresses, wherein one coupling member has lug elements with concave sidewall configurations, whereas another coupling member has lug elements with sidewalls which are convex.

The coupling element or curvic coupling which has teeth having curve side surfaces may also be referred to as curvic coupling wheel or curvic coupling element. Conventionally, a curvic coupling is produced with a gable angle at the base of the profile (trough) to ensure that there is a consistent tooth form produced without mutilation of the teeth or a fin condition observed. Iteration of the designed parameters may be used to modify the design until a suitable profile has been attained.

A coupling element or curvic coupling may be manufactured by grinding using a grinding tool, such as a circular grinding tool having a cross-sectional shape (also refer to as grinding profile), which is suitable for cutting out material from a raw circular working piece in order to produce the curvic coupling. Thereby, the grinding tool or cutter is rotated and is lowered to a raw working piece in an axial direction. Thereby, the grinding tool or cutting tool may at the same time grind or machine two side surfaces of two teeth which are spaced apart in the to be manufactured curvic coupling. When one trough between two adjacent teeth or in particular when two troughs (in particular recesses) between two pairs of respective adjacent teeth have been grinded, the cutting tool or grinding tool is lifted to be withdrawn from the working piece. The working piece is then rotated around its rotation axis to reach another rotational position, at which the grinding tool is again lowered to grind or machine two other troughs between two other pairs or adjacent teeth.

It has been observed that a coupling element may not be inspected or monitored regarding accuracy of the geometry of the coupling element without having readily access to a calibrated set of inspection masters. Typically there are only a low number of sets available for each coupling geometry e.g. one set that is retained by a tool supplier e.g. Gleason Works for reference and one set with the OEM for calibration of the coupling production.

There may be a need for a curvic coupling for rotational coupling, for a coupling system comprising two such curvic couplings and for a grinding tool for manufacturing the curvic coupling.

SUMMARY OF THE INVENTION

This need may be met by the subject matter according to the independent claims. Advantageous embodiments of the present invention are described by the dependent claims.

According to an embodiment of the present invention it is provided a curvic coupling for rotational coupling, the curvic coupling comprising: plural—i.e. a plurality of—teeth arranged in a circle and protruding from a circle plane extending in a radial direction and a circumferential direction, wherein a side surface of a tooth of the plural teeth is opposite to a side surface of another tooth of the plural teeth, wherein the tooth is adjacent to the other tooth and separated from the other tooth by a separating surface, wherein the separating surface comprises a flat surface lying in the circle plane, wherein the separating surface comprises a central protrusion between the side surface of the tooth and the side surface of the other tooth, wherein the protrusion protrudes from the circle plane.

The curvic coupling may be a circular curvic coupling. The curvic coupling may be made of a metal, such as steel. The curvic coupling may be one of two engaging curvic couplings, which allow rotational coupling of two components each component being connected to the respective curvic coupling.

The curvic coupling may for example be used to couple two rotation shafts of a turbo turbine, such as a gas turbine, a compressor, a pump or a steam turbine. For example, the curvic coupling may couple a compressor shaft portion and a turbine shaft portion of a gas turbine or may be used to couple a first portion of a turbine shaft and a second portion of a turbine shaft. Under particular operational conditions of the turbine particular shaft portions or shafts may be connected to each other, while at other operational conditions the shaft portions or shafts may be separated from each other.

The coupling of the two curvic couplings may comprise engagement of teeth of the first curvic coupling with other teeth of the second curvic coupling. In particular, the side surfaces of the teeth of the first curvic coupling may engage with side surfaces of the other teeth of the second curvic coupling, when the two curvic couplings are coupled to each other. When the first curvic coupling is coupled to the second curvic coupling, a rotational motion of one of the first curvic coupling and the second curvic coupling is transferred to a rotational motion of the other curvic coupling.

The curvic coupling may comprise a base structure from which the plural teeth protrude. The base structure may be shaped as a circular ring. The base structure may be integrally formed with the plural teeth.

The curvic coupling may, for example, be manufactured by casting a raw working piece and then machining the raw working piece using a grinding tool according to an embodiment of the present invention. The grinding tool may be a circular ring structure having a particular cross-sectional shape (or profile) to remove material from the raw working piece in order to generate troughs between thus evolving teeth.

The curvic coupling may comprise for example 30 to 50 teeth, in particular 40 teeth. The circle plane may be perpendicular to a rotation axis of two shafts or shaft portions to be coupled by two of the curvic couplings. The rotation axis may define an axial direction and the radial direction may be perpendicular to the axial direction and the circumferential direction. Further, the circumferential direction may be perpendicular to the axial direction and to the radial direction.

In particular, all teeth of the plural teeth protrude from the circle plane to a same extent. In particular, each tooth of the plural teeth comprises a top surface (protruding most from the circle plane) between to side surfaces of the tooth. The top surface may approach a separating surface of two other teeth belonging to a second curvic coupling, when the first curvic coupling is engaged with the second curvic coupling. However, the top surface of a tooth of the first curvic coupling may not touch the separating surface between other teeth of the second curvic coupling. Instead, a clearance may be maintained between the top surface of the tooth of the first curvic coupling and the separating surface between teeth of the second curvic coupling. Thereby, engagement of the first curvic coupling and the second curvic coupling may be effected by mutual contact of only the side surfaces of the teeth of the different curvic couplings.

In a conventional curvic coupling the separating surface between the tooth and the other tooth may be a gable face or a surface having two inclined surface portions with respect to the circle plane. According to this embodiment, however, the separating surface comprises the flat surface (portion or part), which lies within the circle plane. By providing the flat surface between the tooth and the other tooth the manufactured curvic coupling may be monitored or measured with higher accuracy using a measurement device, such as a coordinate measuring machine (CMM), which is capable of accurately examining the shape of the curvic coupling, in particular the shape of the teeth and the separating surface, in order to determine the geometrical properties of the curvic coupling. In particular, a height of the tooth, i.e. an axial extent of the tooth measured from the circle plane to the surface to the top surface of the tooth may be determined using a coordinate measuring machine with high accuracy. This has not been possible using the conventional profile or geometry of the separating surface. Thereby, the manufacturing of the curvic coupling may be improved.

The separating surface between the tooth and the other tooth does not need to be flat in its entirety. However, a portion of the separating surface is a flat surface. Thereby, the height of the tooth may be easily measured by measuring a distance from the flat surface to the top surface of the tooth to be measured.

The central protrusion may also be referred to as central cusp. The central protrusion may be a consequence of avoiding mutilation of the rounded corner between the side surface of the tooth and the separating surface.

In particular, a width of the circular ring surface of the grinding tool (used to manufacture the curvic coupling) may be smaller than a circumferential extent between the tooth and the other tooth in a radially central section such that when using the grinding tool for removing material between the tooth and the other tooth to be formed some material in a central area between the tooth and the other tooth may be maintained (thus not removed) which then finally forms the central protrusion. However, by selecting the width of the circular ring surface of the grinding tool to be less than a circumferential extent of the separating surface at the radially inner end thereof may avoid mutilation or grinding of or removing the rounded corner between the side surface of the tooth and the separating surface.

According to an embodiment of the present invention the separating surface is flat in a radially inner portion of the separating surface and/or is in particular flat in a radially outer portion of the separating surface. Thereby, in particular, the height of the tooth may be measured in the radially inner region or the radially outer region of the circular curvic coupling.

According to an embodiment of the present invention the separating surface is flat in a portion of the separating surface adjacent to the side surface of the tooth and/or in another portion of the separating surface adjacent to the side surface of the other tooth, wherein in particular a width of the portion of the separating surface adjacent to the side surface of the tooth and/or of the other portion of the separating surface adjacent to the side surface of the other tooth is less than, is in particular between 0.5 and 0.9 of, a width of the separating surface in a radially innermost portion of the separating surface.

Thereby, in particular, the height may be accurately measured at all radial positions from the radially inner end of the separating surface to the radially outer end of the separating surface, wherein the radially inner end of the separating surface may also correspond to a radially inner end of the tooth and wherein the radially outer end of the separating surface may also correspond to a radially outer end of the tooth. In particular, when the width of the portion of the separating surface adjacent to the side surface of the tooth is less than the width of the separating surface in the radially inner most portion of the separating surface, it may be ensured that mutilation of a rounded edge between the side surface of the tooth and the separating surface may be avoided.

In particular, the grinding tool may be adapted in that its ring surface has a particular width, which corresponds or is less than the width of the radially inner portion of the separating surface, in order to not mutilate a rounded edge between the side surface of a tooth and the separating surface.

According to an embodiment of the present invention between the separating surface and the side surface of the tooth and/or between the separating surface and the side surface of the other tooth a rounded corner is formed, in particular having a fillet radius between fillet radius between 0.2 mm and 1.00 mm, in particular between 0.4 mm and 0.75 mm.

The round corner may be a rounded edge primarily extending in the radial direction but being curved in accordance with a curvature of the side face of the tooth. Having a rounded corner between the separating surface and the side surface of the tooth may reduce stress, which would be present, if at this location a sharp edge would be present. The rounded corner may extend along the entire path from the radially inner end of the separating surface to the radially outer end of the separating surface. Thereby, a particular stable construction may be provided which may withstand high wear.

According to an embodiment of the present invention the rounded corner is formed at the radially inner portion of the separating surface, wherein the rounded corner is in particular formed at the innermost portion of the separating surface. In particular, the rounded corner is not mutilated due to a manufacturing process using a grinding tool machining or removing material between the tooth and the other tooth to be formed. In particular, the grinding tool is configured such that, while a side surface of a tooth is machined the side surface of the other tooth adjacent to the tooth is not mutilated, in particular wherein at least the rounded corner between the side surface of the other tooth and the separating surface is not mutilated by further grinding material away from the rounded corner.

Thereby, stress at the radially inner portion of the separating surface or the side surface of the tooth or of the other tooth may be reduced.

According to an embodiment of the present invention the side surface of the tooth and/or the other tooth are concavely or convexly curved, having a radius of curvature which is between 1.0 and 5.0, in particular between 1.0 and 1.5, times a radius of the circle, wherein a center of curvature is in particular arranged in the circle plane radially outwards of the curvic coupling.

Providing the side surfaces of the tooth and/or the other tooth with concave or convex shapes may allow manufacturing the curvic coupling using a grinding tool according to embodiments of the present invention. In particular, the radius of the grinding tool may be larger than the radius of the curvic coupling. Thereby, manufacturing the curvic coupling may be simplified.

According to an embodiment of the present invention the protrusion protrudes from the circle plane between 1% and 10% of an extent of the tooth in the axial direction.

According to an embodiment of the present invention the protrusion has a side surface opposite to the side surface of the tooth, wherein the protrusion has another side surface opposite to the side surface of the other tooth, wherein the side surface of the protrusion includes a protrusion side angle between 5° and 45° with the circle plane, wherein the other side surface of the protrusion includes another protrusion side angle between 5° and 45° with the circle plane.

In particular, the protrusion side angle may be selected based on a width of the separating surface at the radially innermost end, based on the width in the circumferential direction of the flat surface at the radially inner end and based on the characteristics of the rounded corner, in particular a fillet radius thereof. In particular, the angle may be chosen such that the central protrusion is manufacturable by a grinding tool which during operation of manufacturing the curvic coupling does not remove material at a side opposite to the manufacturing side which may affect the rounded corner.

According to an embodiment of the present invention the side surface of the protrusion and the other side surface of the protrusion join at a center between the tooth and the other tooth at a, in particular radially extending, crest protruding from the circle plane by between 1% and 10% of an extent of the tooth in the axial direction.

Keeping the extent of the central protrusion between these limits may ensure that the central protrusion does not interfere with a top surface of a tooth of an engaging second curvic coupling. Thereby, the coupling process may not be disturbed.

According to an embodiment of the present invention a portion of the side surface of the tooth, which portion is closest to the separating surface includes a side face angle with the circle plane being between 150° and 110°. Thereby, a particular orientation of the side surface of the tooth may be achieved for effective coupling of the curvic coupling with another curvic coupling.

According to an embodiment of the present invention a portion of the side surface of the tooth which portion is farthest away from the separating surface includes another side face angle with the circle plane which is less than the side face angle, which is in particular between 170° and 140°.

Thereby, angles between adjacent surfaces of the tooth may be lowered in order to avoid in particular sharp edges.

According to an embodiment of the present invention at least a part of the curvic coupling including the tooth, the other tooth and the separating surface exhibits a mirror symmetry with a mirror plane lying between the tooth and the other tooth, the mirror plane being perpendicular to the circle plane.

The mirror symmetry may at least be approximately satisfied. In particular, during a first manufacturing step the side surface of the tooth may be machined using the grinding tool. Then, the grinding tool may be lifted up from the curvic coupling and may be flipped so such that a grinding surface of the grinding tool gets in contact with the side surface of the other tooth to be manufactured. The mirror symmetry may result from the mirror symmetric manufacturing steps to form the side surface of the tooth on the one hand and to form the side surface of the other tooth on the other hand.

According to an embodiment of the present invention it is provided a coupling system comprising a curvic coupling having teeth with concave side faces according to an embodiment as described above, and another curvic coupling having teeth with convex side faces according to an embodiment as described above, wherein the curvic coupling and the other curvic coupling are configured to engage each other via at least one contact (point or area) between a side surface of a tooth of the curvic coupling and a side surface of a tooth of the other curvic coupling.

The curvic coupling may be manufactured using a grinding tool according to an embodiment of the present invention and the other curvic coupling may be manufactured using another grinding tool according to an embodiment of the present invention.

According to an embodiment a grinding tool for manufacturing a curvic coupling, in particular a curvic coupling according to one of the afore-mentioned embodiments, is provided, wherein the grinding tool comprises a circular ring surface lying in a circle plane for grinding a flat surface of a separating surface separating two adjacent teeth of the curvic coupling, a side surface joining the ring surface and inclined relative to the circle plane for grinding a side surface of a tooth of the two adjacent teeth of the curvic coupling, and a surface portion joining the circular ring surface and inclined relative to the circle plane for forming a central protrusion between teeth of the curvic coupling.

For manufacturing a curvic coupling having convex teeth a different grinding tool may be used than for manufacturing a curvic coupling having concave teeth.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

"Inner" and "outer", "innermost" and "outermost" are understood in the sense that the curvic coupling is providing a plurality of teeth arrange on a circle—i.e. a toroid or a hollow cylinder-, the circle having a centre and "inner" means a position which is closer to the centre then "outer". "Inner" surface or "inner" part means a section of the surface or the part that is closer to the centre than other sections of the surface or part.

BRIEF DESCRIPTION OF THE DRAWINGS

Embodiments of the present invention are now described with reference to the accompanying drawings. The invention is not limited to the described or illustrated embodiments.

DETAILED DESCRIPTION

Figure 1:
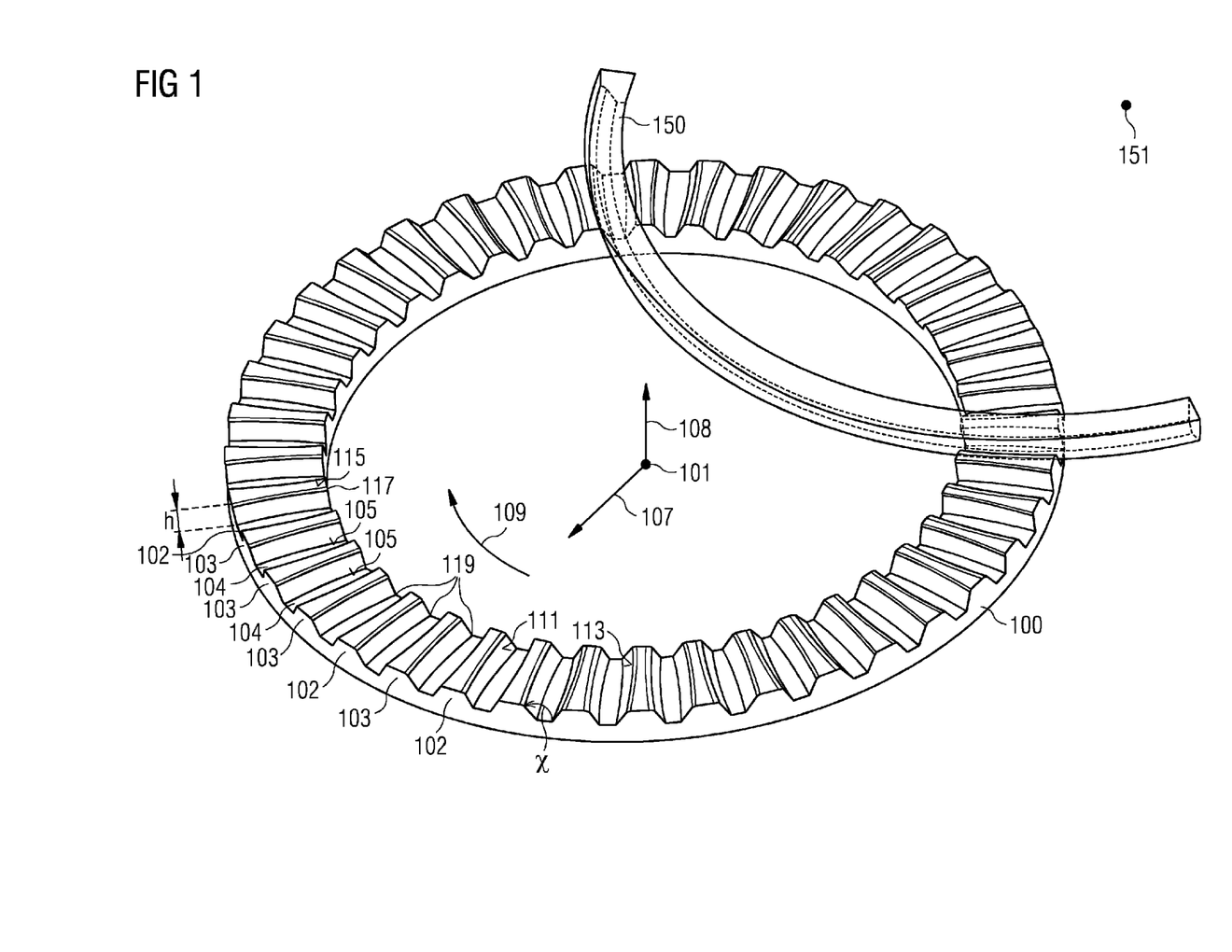
FIG. 1 shows a schematical perspective view of a curvic coupling with a grinding tool according to embodiments of the present invention.

FIG. 1 illustrates a perspective view of a curvic coupling 100 and a grinding tool 150 according to embodiments of the present invention. The curvic coupling 100 has a circular shape having a center 101. The curvic coupling 100 comprises plural teeth 102, 103, which are arranged adjacent to each other in a circle having the center 101. The teeth 102, 103 protrude from a circle plane defined by a plane in which flat surface portions 105 between adjacent teeth 102, 103 lie. The circle plane extends in a radial direction 107 and also in a circumferential direction 109 both perpendicular to the axial direction 108. A side surface 111 of a tooth 103 is opposite to a side surface 113 of another tooth 102 which is adjacent to the tooth 103. The tooth 103 is separated from the adjacent tooth 102 by a separating surface, which is in the illustrated embodiment formed by the flat surface 105 which is entirely flat across its entire extent between the adjacent teeth 102, 103. The teeth 102, 103 have concavely shaped side surfaces 111 and 113.

According to another embodiment the curvic coupling has convex side surfaces 111 and 113 and the curvic coupling having the concave side surfaces engages with the curvic coupling having the convex side surfaces to provide a rotational coupling between two elements connected to the respective curvic couplings.

An axial direction 108 is perpendicular to the radial direction 107 and also perpendicular to the circumferential direction 109. The flat surfaces 105 in this embodiment representing the separating surface 104 between adjacent teeth is suitable for using a coordinate measuring machine for measuring optical or geometrical properties of the curvic coupling 100, in particular to measure a height h of the teeth 102, 103. The height h represents the extent of the tooth 102, 103, respectively, in the axial direction 108 from the circle plane defined by the flat surfaces 105 and an upper surface 115 of the tooth 102, 103.

The side surfaces 111, 113 include an angle $\chi$ with the flat surface 105, wherein $\chi$ ($180°$-$\alpha$, see FIG. 2) is between $150°$ and $110°$. Between the side surfaces 111, 113 and the top surface 115 a narrow joining surface 117 is provided which includes an angle $\delta$ ($180°$-$\beta$, see FIG. 2) between $170°$ and $140°$ with the circle plane. Between the side surfaces 111, 113 and the separating surfaces represented by the flat surfaces 105 a rounded corner 119 is formed which will be described in more detail with reference to FIG. 3.

The grinding tool 150 from which in FIG. 1 only a circular section is illustrated is a circular ring structure having a particular profile for grinding the troughs between the teeth 102, 103 of the curvic coupling 100. The curvic coupling 150 has a circular shape having a center 151. During machining or grinding for manufacturing the curvic coupling 100 the grinding tool 150 rotates around the axial direction 108 around the center 151.

Figure 2:
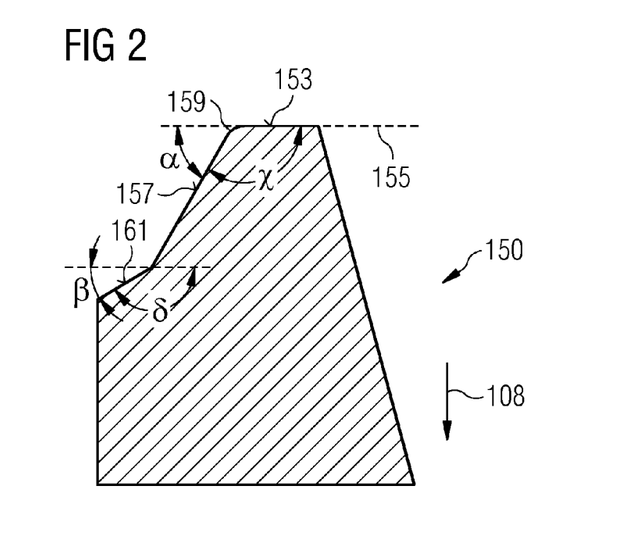
FIG. 2 illustrates a cross-sectional view of a grinding tool according to an embodiment of the present invention used to manufacture the curvic coupling illustrated in FIG. 1.

FIG. 2 illustrates a cross-sectional view of the grinding tool 150 as seen along the circumferential direction of the tool 150. The axial direction 108 is indicated in FIG. 2. The grinding tool 150 has a circular ring surface 153 which lies in circle plane 155 which corresponds to the circle plane of the curvic coupling 100 (see FIG. 1) defined by the flat surface portions 105, when the manufacturing or grinding process using the grinding tool is finished. Thus, in particular, the circular ring surface 153 leads to the formation of the flat surfaces 105 between adjacent teeth 102, 103 of the curvic coupling 100.

Further, the grinding tool comprises a side surface 157 which joins the ring surface 153 via a rounded corner, in particular an outside rounded corner 159. The side surface 157 of the grinding tool 150 forms during the manufacturing or grinding process the side surfaces 111 or 113 of the teeth 103. Further, the rounded outer corner 159 forms, during the grinding process, the rounded corner or edge 119 between the flat surface portions 105 and the side surfaces 111 and 113 of the curvic coupling during the grinding process.

Further, the grinding tool 150 comprises another more narrow side surface portion 161 which eventually forms the narrow surface portions 117 between the side surfaces 111, 113 and the top surface 115 of the teeth 103 of the curvic coupling 100.

Figure 3:
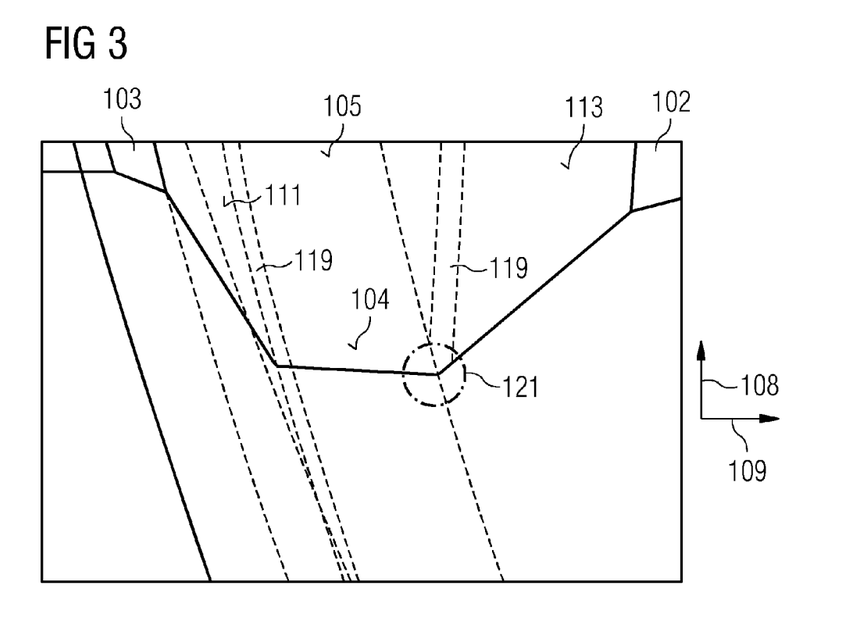
FIG. 3 shows a perspective detailed view of a radially inner portion of the curvic coupling illustrated in FIG. 1 between two teeth.

FIG. 3 illustrates a detailed view, in particular a detailed perspective view of a trough between two teeth 103, 102 of the curvic coupling 100 illustrated in FIG. 1. The teeth 103, 102 comprise the side surfaces 111 and 113, respectively. These side surfaces 111, 113 are separated by the flat surface 105, wherein between the flat surface 105 and the side surfaces 111 the rounded corner 119 is provided. The view of FIG. 3 illustrates a radially inner portion of a region between two adjacent teeth 103. In an area indicated by the circle 121 the rounded edge 119 is mutilated due to the grinding action of the circular ring surface 153 of the grinding tool 150.

Figure 4:
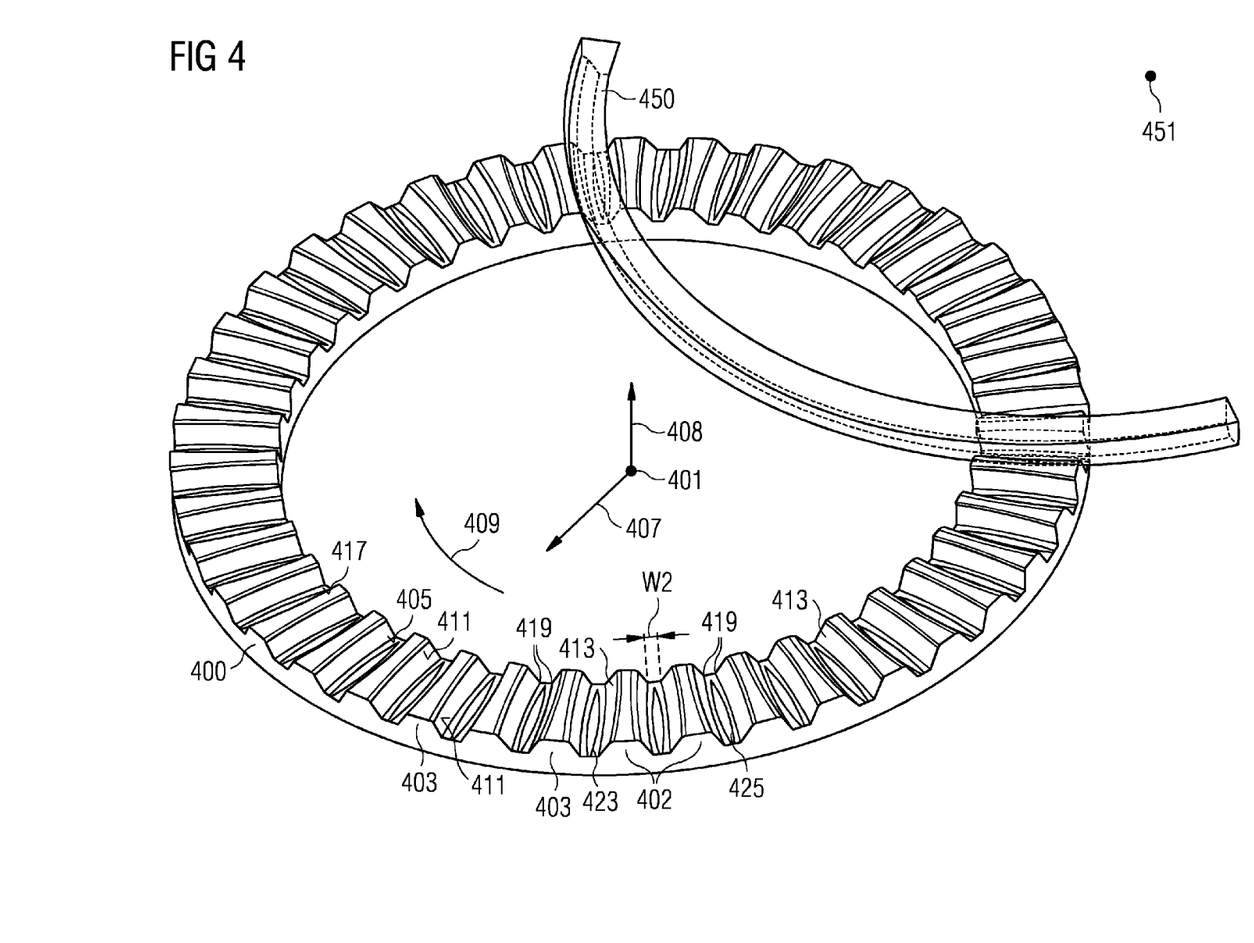
FIG. 4 illustrates a perspective view or a curvic coupling including a grinding tool according to other embodiments of the present invention.

FIG. 4 illustrates a perspective view of another curvic coupling 400 according to another embodiment of the present invention and also illustrating a respective grinding tool 450 which is shaped in order to manufacture the coupling tool 400.

Elements or structures similar in function and/or structure are labeled in FIGS. 1, 2 and 4, 5 with the same reference signs differing only in the first digit.

The curvic coupling 400 comprises plural teeth 403, 402 which are separated from each other by a separating surface 404. The teeth 403, 402 protrude from a circle plane defined by flat surface portions 405 comprised in the separating surfaces 404. In particular, the flat surfaces or surface portions 405 are located in a radially inner portion of the separating surface 404. Further, the separating surface 404 is flat in a portion of the separating surface adjacent to the side surface 411 of a tooth 403 and being flat in another portion of the separating surface 404 adjacent to the side surface 413 of another tooth 402. Between the side surfaces 411, 413 and the flat portions of the separating surface 404 a rounded corner or rounded edge 419 is provided to reduce stress during operation.

In a central area between two adjacent teeth 403, 402 a central protrusion 423 is arranged, which protrudes from the circle plane defined by the flat surface portions 405.

Figure 5:
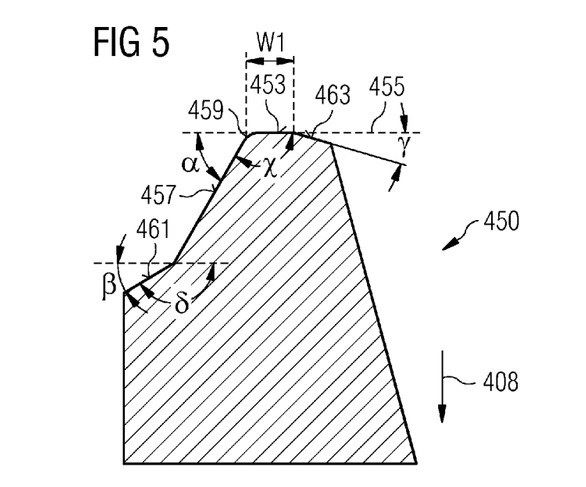
FIG. 5 shows a cross-sectional view of the grinding tool illustrated in FIG. 4 according to an embodiment of the present invention.

FIG. 5 illustrates a cross-sectional view of the grinding tool 450 as seen along its circumferential direction. The axial direction 408 is indicated in FIG. 5. The grinding tool 450 comprises a circular ring surface 453 which lies in a circle plane 455, which corresponds to the circle plane defined by the flat surface portions 405 of the curvic coupling 400 when a manufacturing of the curvic coupling 400 using the grinding tool 450 is completed. Further, the grinding tool 450 comprises a side surface 457, which is provided for grinding the side surfaces 411, 413 of the curvic coupling 400. The side surface 457 of the grinding tool joins the circular ring surface 453 via a rounded corner 459, which will form (during manufacturing) the rounded edge 419 between side surfaces 411, 413 and the flat surface portions 405 of the curvic coupling 400. The side surface 457 includes an angle 360°-χ with the top surface 453. Thus, the side surface 111 of a tooth 403 includes the angle χ (being between 110° and 150° e.g.) with the circle plane defined by the flat surface portions 405. Further, the circular ring structure 453 or the circle plane 455 deviates by an angle a from the side surface 457 of the grinding tool 450. The angle a (being equal to 180°-χ) will define the angle between the side surfaces 411, 413 of the curvic coupling 400 and the flat surface portions 405 of the curvic coupling 400.

Further, the grinding tool 450 comprises another surface portion 461 which deviates by an angle β from the circle plane 455.

Figure 6:
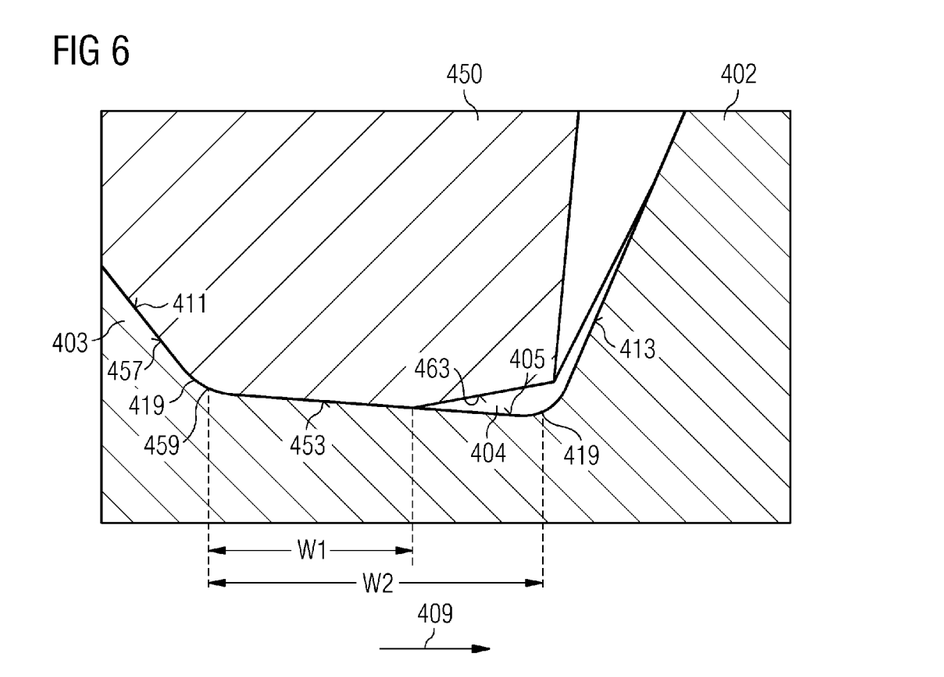
FIG. 6 illustrates a detailed view of a trough between teeth of the curvic coupling illustrated in FIG. 4 together with the grinding tool positioned to manufacture the curvic coupling.

Differing from the grinding tool 150 illustrated in FIG. 2 the grinding tool 450 illustrated in FIG. 5 has a more narrow circular ring surface 453, wherein in particular a width w1 of the circular ring surface in the radial direction of the tool is less than a width w2 of a circumferential extent of the separating surface 404 between adjacent teeth at a radially inner end of the separating surface 404, as is illustrated in FIGS. 4 and 6. In particular, the grinding tool 450 comprises another top surface portion 463, which includes angle γ (e.g. between 10° and 30°) with the circle plane 455 and thus also with the circular ring surface 453. In particular, the width w1 and the angle γ is chosen such that during a grinding process the rounded edge 419 is not deteriorated or mutilated, as it partially occurred using the grinding tool 150 to manufacture the curvic coupling 100.

FIG. 6 schematically shows a trough portion between adjacent teeth 402, 403 of the curvic coupling having the grinding tool 450 placed between the teeth 402, 403 during the manufacturing or grinding process. With respect to FIG. 5 the grinding tool 450 is illustrated upside-down. Due to the fact that the width w1 of the circular ring surface 453 in the radial direction (of the grinding tool 450) is smaller than the width w2 (in the circumferential direction 409) of the separating surface 404, 405 between the teeth 403 and 402, the rounded edge 419 between the side surfaces 413, 411 and the separating surface 404 or the flat portions 405 of the separating surface is not deteriorated or removed during the manufacturing process.

The other top surface 463 of the grinding tool 450 which is inclined relative to the circular ring surface 453 will affect the machining the central protrusion 423. Thus, the grinding tool 450 has an angled profile in its upper portion as illustrated in FIG. 5. Thereby, mutilation of the rounded edges 419 can be avoided. Nevertheless, there is provided between adjacent teeth a flat surface portion 405 for accurately measuring for example the height h of the teeth 402, 403. For measuring for example a coordinate measuring machine may be utilized.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A curvic coupling for rotational coupling, the curvic coupling comprising: plural teeth arranged in a circle and protruding (h) from a circle plane extending in a radial direction and a circumferential direction, wherein a side surface of a tooth of the plural teeth is opposite to a side surface of another tooth of the plural teeth, wherein the tooth is adjacent to the other tooth and separated from the other tooth by a separating surface, wherein the separating surface comprises a flat surface lying in the circle plane, wherein the separating surface comprises a central protrusion between the side surface of the tooth and the side surface of the other tooth, wherein the protrusion protrudes from the circle plane but is not a tooth that drivingly engages another tooth.

2. The curvic coupling according to claim 1, wherein the separating surface is flat in a radially inner portion of the separating surface.

3. The curvic coupling according to claim 1, wherein the separating surface is flat in a portion of the separating surface adjacent to the side surface of the tooth and/or in another portion of the separating surface adjacent to the side surface of the other tooth.

4. The curvic coupling according to claim 3, wherein a width (w1) of the portion of the separating surface adjacent to the side surface of the tooth and/or of the other portion of the separating surface adjacent to the side surface of the other tooth is less than a width (w2) of the separating surface in a radially innermost portion of the separating surface.

5. The curvic coupling according to claim 1, wherein between the separating surface and the side surface of the tooth and/or between the separating surface and the side surface of the other tooth a rounded corner is formed.

6. The curvic coupling according to claim 5, wherein the rounded corner is formed at the radially inner portion of the separating surface.

7. The curvic coupling according to claim 1, wherein the side surface of the tooth and/or the other tooth are concavely or convexly curved, having a radius of curvature which is between 1.0 and 5.0 times a radius of the circle.

8. The curvic coupling according to claim 1, wherein the protrusion protrudes from the circle plane between 1% and 10% of an extent of the tooth in the axial direction.

9. The curvic coupling according claim 1,
wherein the protrusion has a side surface opposite to the side surface of the tooth,
wherein the protrusion has another side surface opposite to the side surface of the other tooth, wherein the side surface of the protrusion includes a protrusion side angle between 5° and 45° with the circle plane, and wherein the other side surface of the protrusion includes another protrusion side angle between 5° and 45° with the circle plane.

10. The curvic coupling according to claim 9, wherein the side surface of the protrusion and the other side surface of the protrusion join at a center between the tooth and the other tooth at a crest protruding from the circle plane by between 1% and 10% of an extent of the tooth in the axial direction.

11. The curvic coupling according to claim 9, wherein a portion of the side surface of the tooth which portion is closest to the separating surface includes an side face angle (180°-α) with the circle plane between 150° and 110°.

12. The curvic coupling according to claim 9, wherein a portion of the side surface of the tooth which portion is farthest away from the separating surface includes another side face angle (180°-β) with the circle plane which is less than the side face angle.

13. The curvic coupling according to claim 1, wherein at least a part of the curvic coupling comprising the tooth, the other tooth and the separating surface exhibits a mirror symmetry with a mirror plane lying between the tooth and the other tooth, the mirror plane being perpendicular to the circle plane.

14. A coupling system, comprising:
a curvic coupling having teeth with concave side surfaces according to claim 1,
another curvic coupling having teeth with convex side surfaces according to claim 1,
wherein the curvic coupling and the other curvic coupling are configured to engage each other via at least one contact between a side surface of a tooth of the curvic coupling and a side surface of a tooth of the other curvic coupling.

15. A grinding tool for manufacturing a curvic coupling, according claim 1, the grinding tool comprising:
a circular ring surface lying in a circle plane for grinding a flat surface of a separating surface separating two adjacent teeth of the curvic coupling;
a side surface joining the ring surface and inclined relative to the circle plane for grinding a side surface of a tooth of the two adjacent teeth of the curvic coupling; and
a surface portion joining the circular ring surface and inclined relative to the circle plane for forming a central protrusion between teeth of the curvic coupling.

16. The curvic coupling according to claim 3, wherein a width (w1) of the portion of the separating surface adjacent to the side surface of the tooth and/or of the other portion of the separating surface adjacent to the side surface of the other tooth is between 0.5 and 0.9 of a width (w2) of the separating surface in a radially innermost portion of the separating surface.

17. The curvic coupling according to claim 5, wherein the rounded corner is formed at the innermost portion of the separating surface.

18. The curvic coupling according to claim 1, wherein the side surface of the tooth and/or the other tooth are concavely or convexly curved, having a radius of curvature which is between 1.0 and 1.5 times a radius of the circle.

19. The curvic coupling according to claim 7, wherein a center of curvature is in particular arranged in the circle plane radially outwards of the curvic coupling.

20. The curvic coupling according to claim 10, wherein the crest is radially extending.

21. The curvic coupling according to claim 9, wherein a portion of the side surface of the tooth which portion is farthest away from the separating surface includes another side face angle (180°-β) with the circle plane which is between 170° and 140°.

22. The curvic coupling according to claim 1, wherein between the separating surface and the side surface of the tooth and/or between the separating surface and the side surface of the other tooth a rounded corner is formed having a fillet radius between 0.2 mm and 1.00 mm.

* * * * *